United States Patent Office 3,447,814
Patented June 3, 1969

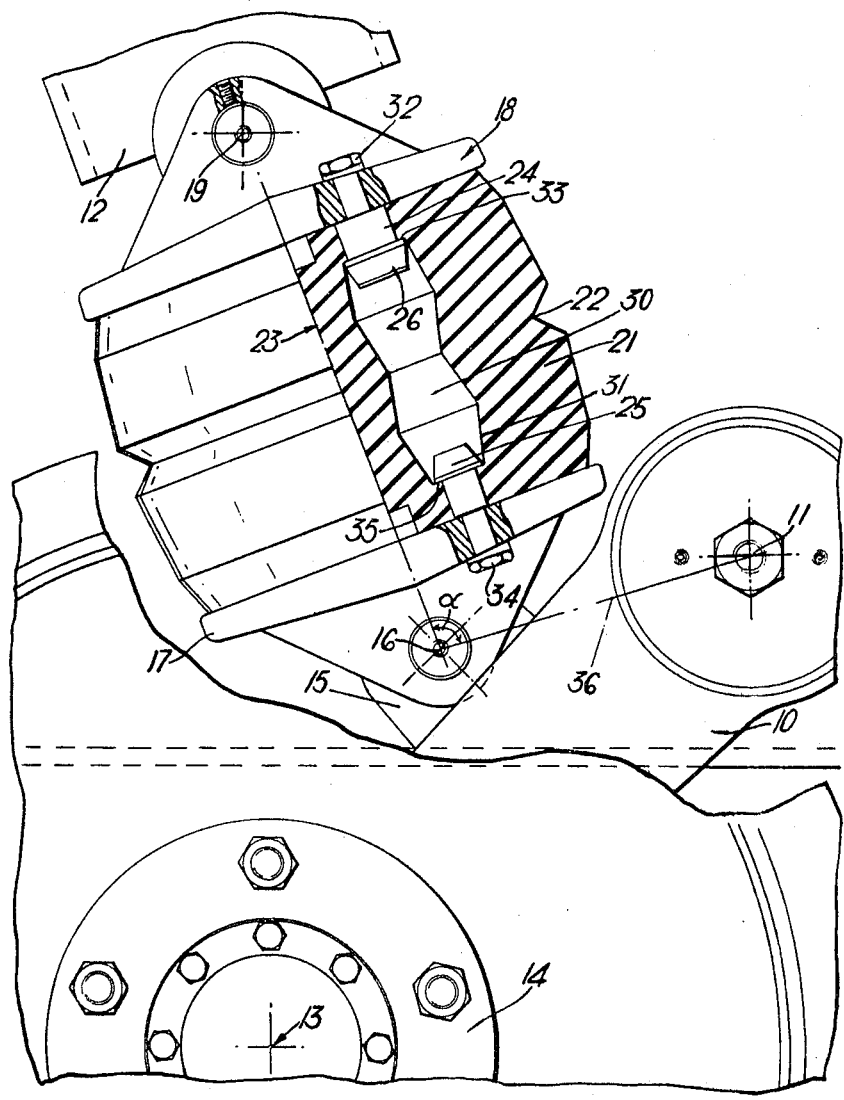

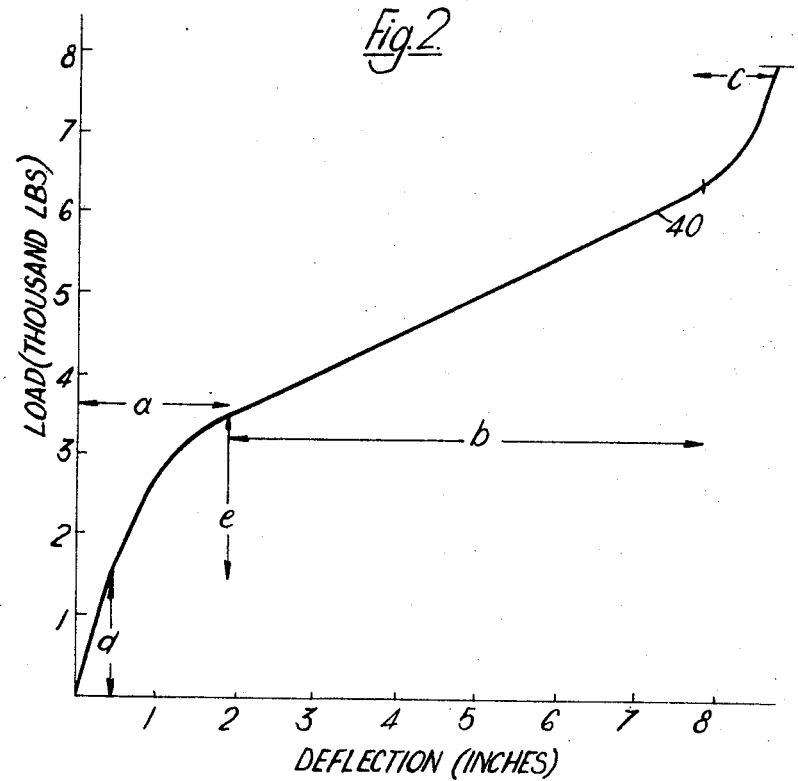

3,447,814
RESILIENT SUSPENSION
Erwin-Walter Siber, Longueuil, Quebec, and Marvin William Keary, Cite de la Salle, Quebec, Canada, assignors to Go-Tract Limited, Les Cedres, Soulange County, Quebec, Canada, a Canadian company
Filed Dec. 23, 1965, Ser. No. 515,976
Claims priority, application Great Britain, Aug. 31, 1965, 37,214/65
Int. Cl. B60g 11/22; B62d 25/00
U.S. Cl. 280—124                                              17 Claims

ABSTRACT OF THE DISCLOSURE

A resilient suspension arrangement for a vehicle is described. The total deflection of the resilient suspension system has at least successive first and second portions with the first portion being a high rate deflection portion extending throughout at least 20% of the total designed deflection and with the second portion being a lower rate portion extending through at least 55% of the total designed deflection at a substantially constant rate which is not more than one third as great as the average rate of the first portion. A third successive portion having a high rate of deflection may extend throughout at least the final 5% of the total designed deflection. The resilient suspension system includes a resilient member which is pivotally interconnected between a trailing arm of a vehicle body and a point of attachment of the vehicle body. The resilient member is attached with its axis at an angle to a line joining the pivotal connection of the resilient member to the trailing arm and a pivotal connection of the trailing arm to the vehicle, and the angle of attachment is preferably within the range of 92°–96° when the vehicle is static and unladen.

---

This invention concerns a resilient suspension and, although the invention is not so restricted, it will for convenience be described hereinafter in connection with its use of a track-laying transporter vehicle.

We have found that, in the case of such a vehicle, it is desirable that the deflection of the resilient suspension of the vehicle should have an initial high rate portion so as to minimise the vertical movement of the road wheels, with respect to the frame of the vehicle, which occurs when the vehicle is loaded. This high initial rate reduces the "nose down" and the "tail down" attitudes in the unladen and fully laden conditions respectively which are generally encountered in present day vehicles. The initial high rate portion further minimises loss of ground clearance at the rear end of the vehicle and change in track length, both of which are detrimental to the desired vehicle performance.

It is also, we have found, desirable for the deflection of the resilient suspension to have, subsequently to the said initial portion, a low rate portion so that there will be relatively large vertical movements of the road wheels, with respect to the frame of the vehicle, at small increases of wheel loads. This provides for a smoother ride for driver and cargo when negotiating rough terrain.

It is, moreover, preferable for the deflection of the resilient suspension to have, subsequently to the low rate portion, a final high rate portion (preferably of progressively increasing rate) in order to reduce shock loads and to help to prevent damage to the vehicle, or to the cargo or equipment carried thereby.

According therefore to the present invention, there is provided a resilient suspension whose total designed deflection has successive first and second portions, the first portion extending throughout at least 20% of the said total designed deflection, and the second portion extending throughout at least 55% of the said total designed deflection and having a substantially constant rate which is not more than one third as great as the average rate of the said first portion.

Preferably the rate of the second portion is not more than one quarter as great as the average rate of the said first portion.

The said first portion preferably has an initial part whose rate is substantially constant and is at least five times as great as that of the second portion. Preferably at least a quarter of the deflection to which the said first portion relates occurs in the said initial part thereof.

The said second portion preferably has a rate not exceeding 550 lbs./in.

The total designed deflection preferably has a third portion which is arranged successively of the second portion and whose average rate is at least twice as great as the rate of the second potrion. Thus the average rate of the third portion is preferably at least three times as great as the rate of the second portion.

Preferably the first portion extends throughout the first 20% to 30% of the total designed deflection, the second portion extends throughout the next 55% to 70% thereof, and the third portion extends throughout the final 5% to 20% thereof.

The said third portion preferably has a progressively increasing rate.

The suspension preferably has one single resilient member only. The resilient member is cylindrical in form and is made from an elastomeric material having a durometer hardness in the range of 55 to 75. The resilient member is formed with internal recesses which pass completely through the member along line parallel to the axis along which the resilient member is compressed. The recesses receive limit stop members from opposite ends of the resilient member, and opposed limit stop members contact each other when full deflection of the resilient member occurs.

The suspension may comprise a trailing arm which is mounted for movement about a first pivot which is adapted to be fixed to a body, the trailing arm being adapted to be connected, at a point remote from the first pivot, to a support member which supports said body, and a resilient member one end of which is secured to a second pivot which is adapted to be fixed to the body and the other end of which is connected to a third pivot which is secured to the trailing arm for movement therewith in unison about the first pivot. Preferably the angle between the axis of the resilient member and the line joining the first and third pivots, when the said body is static and unladen, is within the range 92°–96°.

The resilient member is preferably a cylindrical member of resilient material. The resilient material may, for example, have a durometer hardness in the range 55 to 75.

The cylindrical member is preferably provided with at least one external recess intermediate its ends.

Moreover, there are preferably mounted in the opposite ends of the cylindrical member limit stops which engage each other when the said total designed deflection occurs, whereby to prevent further deflection. The limit stops are preferably secured to adjacent parts of the suspension and are not withdrawable from the cylindrical member during a rebound, whereby the extent to which the said adjacent parts can become separated during a rebound is limited.

The invention also comprises a vehicle (e.g. a track-laying transporter) provided with a resilient suspension as set forth above.

The invention is illustrated, merely by way of example, in the accompanying drawings, in which:

FIGURE 1 is an elevation, partly in section, of a resilient suspension according to the present invention, and FIGURE 2 is a graph showing the load/deflection curve of the resilient suspension of FIGURE 1.

In FIGURE 1 there is shown a resilient suspension of a track-laying transporter vehicle comprising a trailing arm 10 the upper end of which is mounted for movement about a pivot 11 which is fixed to the frame or body 12 of the vehicle. The lower end of the trailing arm 10 carries, at a point remote from the pivot 11, an axle 13 of one of the road wheels 14 which support the frame 12 and which run on the vehicle track (not shown).

The trailing arm 10 is provided with a lug 15 which is secured to the trailing arm 10 for movement in unison therewith about the pivot 11, the lug 15 being provided with a pivot 16. A spring plate 17 is pivotally mounted on the pivot 16.

A spring plate 18 is pivotally mounted on a pivot 19 which is fixed to the frame 12.

Mounted between the spring plates 17, 18 is a cylindrical spring 21 of rubber or rubber-like material, the spring plates 17, 18 engaging opposite ends thereof. The said rubber or rubber-like material may have a durometer hardness in the range 55 to 75, while the cylindrical spring 21 is provided, intermediate its ends, with an external, V-section recess 22.

Mounted in the upper end of the cylindrical spring 21, on opposite sides of the axis 23 thereof, are a pair of limit stops 24 (only one shown). Mounted, moreover, in the lower end of the cylindrical spring 21, on opposite sides of the axis 23 thereof, are a pair of limit stops 25 (only one shown) which are aligned with the limit stops 24. The limit stops 24, 25 are respectively provided with frusto-conical heads 26, 27 each pair of which extend into an internal recess 30 in the cylindrical spring 21. Each internal recess 30 is made up of four frusto-conical portions 31, adjacent portions 31 tapering in opposite directions.

The heads 26, 27 of each pair of limit stops 24, 25 will engage each other at the "full bump" position, i.e. at the position at which the total designed deflection of the suspension occurs, whereby to prevent further deflection.

The limit stops 24 are secured by nuts 32 to the spring plate 18 and are provided with shoulders 33, behind the heads 26, which prevent the heads 26 from being withdrawn from the cylindrical spring 21 during a rebound. Similarly, the limit stops 25 are secured by nuts 34 to the spring plate 17 and are provided with shoulders 35, behind the heads 27, which prevent the heads 27 from being withdrawn from the cylindrical spring 21 during a rebound. Accordingly, the extent to which the spring plates 17, 18 (and hence other parts of the suspension) can become separated during a rebound are limited.

We have found that the characteristic load/deflection curve of the suspension described above is considerably affected by the value of the angle $\alpha$ between the axis 23 and a line 36 joining the pivots 11, 16, and that this angle $\alpha$, when the vehicle is static and unladen, is desirably within the range 92°–96°.

In FIGURE 2 there is shown the load/deflection curve 40 for the case where the angle $\alpha=95°$. The curve indicates the extent of the deflection (i.e. the extent of vertical movement of the wheels 14 with respect to the frame 12) which occurs from zero wheel load to the "full bump" wheel load of 8000 lbs. for which the suspension was designed.

As will be seen, the curve 40 have three portions $a$, $b$, $c$ which are arranged successively of each other. The portion $a$ extends throughout 21.2% of the total designed deflection of the suspension, the portion $b$, extends throughout 67.4% thereof, and the portion $c$ extends throughout 11.4% thereof. As will be appreciated these specific figures (and those given below) apply only to the specific curve 40, since the portion $a$ may for example extend throughout 20% to 30% of the total designed deflection, the portion $b$ may extend throughout 55% to 70% thereof, and the portion $c$ throughout 5% to 20% thereof.

The portion $a$ has an initial part $d$, whose rate is substantially constant and has the approximate value 3100 lbs./in., and a final part $e$ of progressively decreasing rate. The approximate value of the average rate of the whole portion $a$ is 2300 lbs./in. At least a quarter of the deflection which occurs in the whole portion $a$ occurs in the part $d$ thereof.

The portion $b$ has a substantially constant rate having the approximate value of 500 lbs./in. It will therefore be appreciated that the rate of the portion $b$ is less than a quarter of the average rate of the whole portion $a$. Moreover, the rate of the part $d$ is more than six times as great as that of the portion $b$.

The portion $c$ is of progressively increasing rate, the average rate of the portion $c$ being approximately 1650 lbs./in. Thus the average rate of the portion $c$ is more than three times as great as the rate of the portion $b$.

Thus although each wheel 14 is carried by a suspension having one single spring only, the resiliency of the suspension is such that its deflection has an initial high rate portion $a$ so as to minimise the vertical movement of the wheels 14 with respect to the frame 12 which occurs when the vehicle is loaded, a subsequent low rate portion $b$ to provide a smoother ride for driver and cargo when negotiating rough terrain, and a final high rate portion $c$ to reduce shock loads prior to reaching the "full bump" position.

We claim:

1. A suspension arrangement for a vehicle comprising a resilient suspension system having a resilient member included therein, said resilient suspension system being interconnected between a wheel means and the body of the vehicle so as to permit vertical deflection of the wheel means relative to the body, the total deflection of said resilient suspension system, with its included resilient member, having successive first and second portions of deflection, the first portion extending throughout at least 20% of the said total designed deflection of the system, and the second portion extending throughout at least 55% of the said total designed deflection and having a substantially constant rate of deflection which is not more than one third as great as the average rate of deflection of the said first position, said suspension system including a trailing arm which is mounted for movement about a first pivot fixed to the vehicle body, the trailing arm being adapted to be connected, at a point remote from the first pivot, to said wheel means, said resilient member further having one end secured to the second pivot fixed to the vehicle body, and a second end secured to a third pivot which is secured to the trailing arm for movement therewith in unison about said first pivot and said resilient member being generally cylindrical in shape with recesses formed from end to end therethrough, said resilient member being formed from a resilient material having a durometer hardness in the range of 55 to 75, and said resilient member being related to the vehicle and to said trailing arm so that the angle formed between the axis of the resilient member and a straight line joining said first and third pivots is within the range of 92° to 96° when the vehicle is static and unladen.

2. A resilient suspension system as claimed in claim 1 in which the rate of deflection of the second portion is not more than one quarter as great as the average rate of deflection of the said first portion.

3. A resilient suspension system as claimed in claim 1 in which the said first portion has an initial part whose rate is substantially constant and is at least five times as great as that of the second portion.

4. A resilient suspension system as claimed in claim 2 in which at least a quarter of the deflection to which the said first portion relates occurs in the said initial part thereof.

5. A resilient suspension system as claimed in claim 1 in which the total designed deflection has a third portion which is arranged successively of the second portion and whose average rate is at least twice as great as the rate of the second portion.

6. A resilient suspension system as claimed in claim 5 in which the average rate of the third portion is at least three times as great as the rate of the second portion.

7. A resilient suspension system as claimed in claim 5 in which the first portion extends throughout the first 20% to 30% of the total designed deflection, the second portion extends throughout the next 55% to 70% thereof, and the third portion extends throughout the final 5% to 20% thereof.

8. A resilient suspension system as claimed in claim 5 in which the said third portion has a progressively increasing rate.

9. A resilient suspension system as claimed in claim 1 in which the suspension system has one single resilient suspension member only.

10. A resilient suspension system as claimed in claim 1 in which limit stops are mounted in the opposite ends of the cylindrical member and in said recesses so that the limit stops engage each other when the said total designed deflection occurs, thereby preventing further deflection.

11. A resilient suspension system as claimed in claim 10 in which the limit stops are secured to adjacent parts of the suspension and are not withdrawable from the cylindrical member during a rebound, whereby the extent to which the said adjacent parts can become separated during a rebound is limited.

12. A resilient suspension system as claimed in claim 1 in which the vehicle is a track-laying transporter.

13. In a suspension system for vehicles wherein a support wheel means is mounted to a body portion of a vehicle so that the support wheel means can be deflected relative to the vehicle, and wherein a resilient member is interconnected between said support wheel means and a portion of the vehicle body, the improvement in said resilient member comprising:

a spring means made from an elastomeric or rubber material, a plurality of recesses formed into opposite ends of the spring means for receiving and carrying portions of attachment means associated with the opposite ends of the spring means, said portions of the attachment means extending into said recesses for a sufficient distance to function as limit stops when said spring means reaches its total designed deflection, thereby preventing any further deflection, said recesses being formed completely through said spring means so that opposed limit stops can engage each other when total designed deflection occurs, and said limit stops and said recesses being of relative sizes which prevents a squeezing of the material from which the spring means is made when opposed limit stops move toward each other, and attachment means associated with opposite ends of said spring means for connecting one end of the spring means to a pivot fixed to a portion of the vehicle body and an opposite end of the spring means to a pivot fixed to structure associated with said wheel means.

14. The improvement of claim 13 wherein said spring means comprises a cylindrical member of resilient material having a durometer hardness in the range of 55 to 75.

15. The improvement of claim 14 wherein said cylindrical member is provided with at least one external recess intermediate its opposite ends.

16. The improvement of claim 13 wherein said spring means is interconnected between a portion of a vehicle body and a pivot on a trailing arm whcih carries the support wheel means, and wherein said trailing arm is pivoted to said vehicle body.

17. The improvement of claim 16 wherein the angle between the axis of the spring means and a line joining the pivot of the trailing arm to the vehicle body and the pivot of the spring means attachment to the trailing arm is within the range of 92°–96° when the vehicle is static and unladen.

References Cited

UNITED STATES PATENTS

| | | | |
|---|---|---|---|
| 2,403,362 | 7/1946 | Hait | 305—27 |
| 3,305,227 | 2/1967 | Henley. | |
| 3,323,786 | 6/1967 | Boschi. | |
| 3,263,985 | 8/1966 | Planta | 267—63 |
| 3,315,951 | 4/1967 | Boschi et al. | 267—63 |

FOREIGN PATENTS 1,157,837  1/1958  France.

OTHER REFERENCES

A. M. Wahl, Mechanical Springs, 1944, p. 258, copy in Gp. 317.

PHILIP GOODMAN, Primary Examiner.

U.S. Cl. X.R.

267—1, 63